(12) United States Patent
Zhu et al.

(10) Patent No.: US 9,627,900 B2
(45) Date of Patent: Apr. 18, 2017

(54) POWER ADAPTER

(71) Applicant: FOXCONN INTERCONNECT TECHNOLOGY LIMITED, Grand Cayman (KY)

(72) Inventors: Zhi-Wen Zhu, Kunshan (CN); Ling-Jie Meng, Kunshan (CN); Qi-Sheng Zheng, Kunshan (CN); Chun-Ming Yu, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/987,785

(22) Filed: Jan. 5, 2016

(65) Prior Publication Data

US 2016/0197420 A1 Jul. 7, 2016

(30) Foreign Application Priority Data

Jan. 5, 2015 (CN) .......................... 2015 1 0001483

(51) Int. Cl.
*H02J 7/00* (2006.01)

(52) U.S. Cl.
CPC .................. *H02J 7/0044* (2013.01)

(58) Field of Classification Search
USPC .......... 439/78, 173, 172, 131, 357, 351, 680
See application file for complete search history.

(56) References Cited

U.S. PATENT DOCUMENTS

| | | | | |
|---|---|---|---|---|
| 4,647,128 A * | 3/1987 | Maros | ................ | H01R 13/6271 439/350 |
| 5,772,453 A * | 6/1998 | Tan | .................... | H01R 23/6873 439/567 |
| 6,086,395 A * | 7/2000 | Lloyd | ................ | H01R 13/6675 363/146 |
| 7,658,625 B2 * | 2/2010 | Jubelirer | .............. | H01R 31/065 439/131 |
| 7,946,868 B1 * | 5/2011 | Chen | .................... | H01R 13/625 439/173 |
| 8,011,975 B1 * | 9/2011 | Kim | ..................... | H01R 13/506 439/651 |

(Continued)

FOREIGN PATENT DOCUMENTS

CN 101719603 A 6/2010
CN 102306887 A 1/2012
(Continued)

*Primary Examiner* — Alexander Gilman
(74) *Attorney, Agent, or Firm* — Wei Te Chung; Ming Chieh Chang

(57) ABSTRACT

A power adapter comprises a cover and a printed circuit board module received in the cover. The cover has a base and an upper cover covering the base, the base has a bottom wall and a plurality of side walls surrounding the bottom wall, the bottom wall and the side walls form a receiving space for receiving the printed circuit board module. The cover has a plurality of latching members at the top of the side wall, the latching members are on both ends of the cover, the latching members are defined above the upper cover and extend to each other. The side walls comprise a first side wall with a rotatablely movable block, the latching member is defined at the top of the movable block, the latching member moves outward with the movable block rotating.

20 Claims, 12 Drawing Sheets

(56) References Cited

U.S. PATENT DOCUMENTS

| | | | | | |
|---|---|---|---|---|---|
| 8,033,846 | B2 * | 10/2011 | Youssefi-Shams | .... | H01R 13/44 |
| | | | | | 439/172 |
| 8,113,855 | B2 * | 2/2012 | Green | ............ | H01R 13/44 |
| | | | | | 439/131 |
| 8,277,239 | B1 * | 10/2012 | Chan | ............ | H01R 27/00 |
| | | | | | 439/189 |
| 8,821,181 | B1 * | 9/2014 | Lam | ............ | H01R 24/60 |
| | | | | | 439/357 |
| 8,847,759 | B2 * | 9/2014 | Bisesti | ............ | G08B 13/1463 |
| | | | | | 340/568.1 |
| 9,153,986 | B1 * | 10/2015 | Herr | ............ | H02J 7/0044 |
| 9,293,869 | B2 * | 3/2016 | Ning | ............ | H01R 13/6594 |
| 9,343,850 | B2 * | 5/2016 | Colahan | ............ | H01R 13/6675 |
| 9,362,765 | B1 * | 6/2016 | Blaszczak | ............ | H01R 3/00 |
| 2010/0093215 | A1 * | 4/2010 | Xiong | ............ | H01R 13/65802 |
| | | | | | 439/607.19 |

FOREIGN PATENT DOCUMENTS

| | | |
|---|---|---|
| TW | 200847737 A | 12/2008 |
| TW | M453274 | 5/2013 |

* cited by examiner

POWER ADAPTER

FIELD OF THE INVENTION

The present invention relates to a power adapter, and more particularly to a power adapter charging for electronic products and transmitting data with external devices.

DESCRIPTION OF THE PRIOR ART

T.W. Patent No. M453274 discloses a power socket including a cover and a printed circuit board module within the cover. The printed circuit board module includes a printed circuit board, a plurality of electronic components mounted onto the printed circuit board, a plurality of control chips and a plurality of import/output electrical connectors. The import/output electrical connectors include a USB 2.0 connector. The cover includes an upper cover and a lower cover mounted with the upper cover. The upper cover and the lower cover define a receiving space for receiving the printed circuit board module. The upper cover includes a plurality of positioning posts with screw thread, the lower cover includes a plurality of ribs, each of the ribs defines a through hole, the printed circuit board defines a plurality of through holes. The upper cover, the printed circuit board and the lower cover are locked together by a plurality of screws passing through the through holes of the lower cover and the printed circuit board. The cover includes an opening for exposing the interface of the electrical connector. One end of the power socket connects a cable, the other end of the cable includes a plug for connecting to an external source.

With the miniaturization trend of electronic products and the rapid development of wearable electronic products, the volume of the power socket is large, and it is not easy to carry.

It is desired to obtain a new power adapter.

SUMMARY OF THE INVENTION

Accordingly, an object of the present invention is to provide a new power adapter.

In order to achieve the object set forth, a power adapter comprises a cover and a printed circuit board module received in the cover. The cover has a base and an upper cover covering the base, the base has a bottom wall and a plurality of side walls surrounding the bottom wall, the bottom wall and the side walls form a receiving space for receiving the printed circuit board module. The cover has a plurality of latching members at the top of the side wall, the latching members are on both ends of the cover, the latching members are defined above the upper cover and extend to each other. The side walls comprise a first side wall with a rotatablely movable block, the latching member is defined at the top of the movable block, the latching member moves outward with the movable block rotating.

DESCRIPTION OF PREFERRED EMBODIMENT

Figure 1:
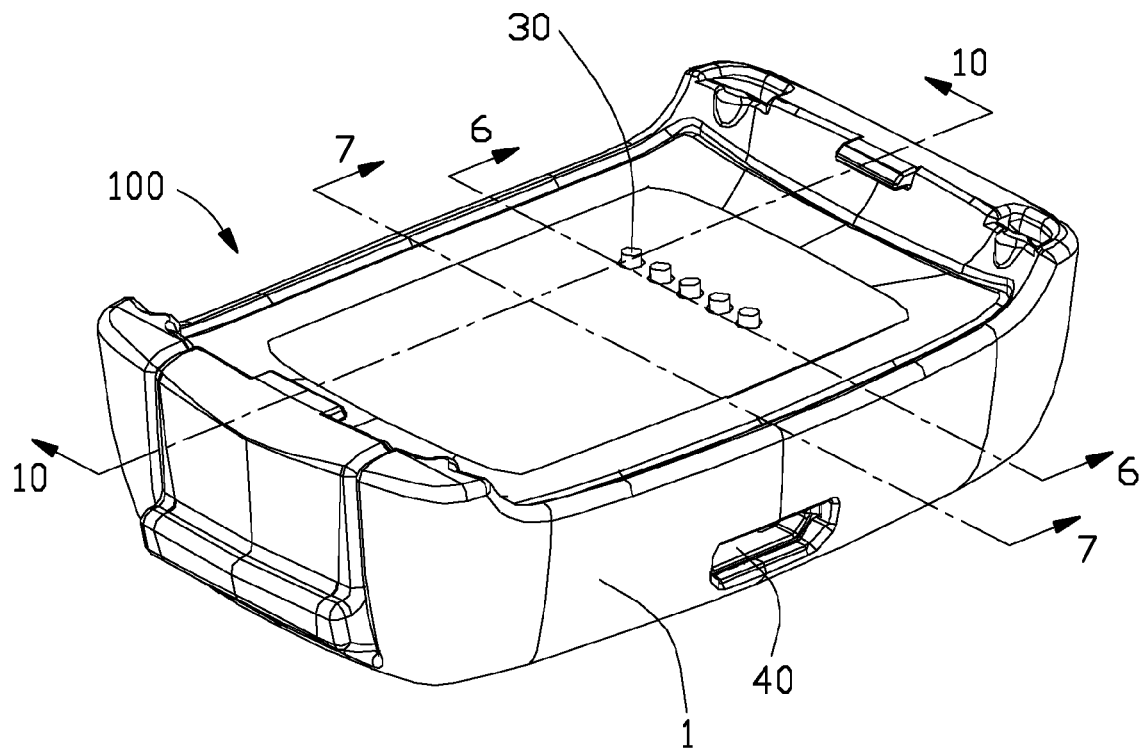
FIG. 1 is a perspective view of a power adapter in accordance with the present invention.
Figure 2:
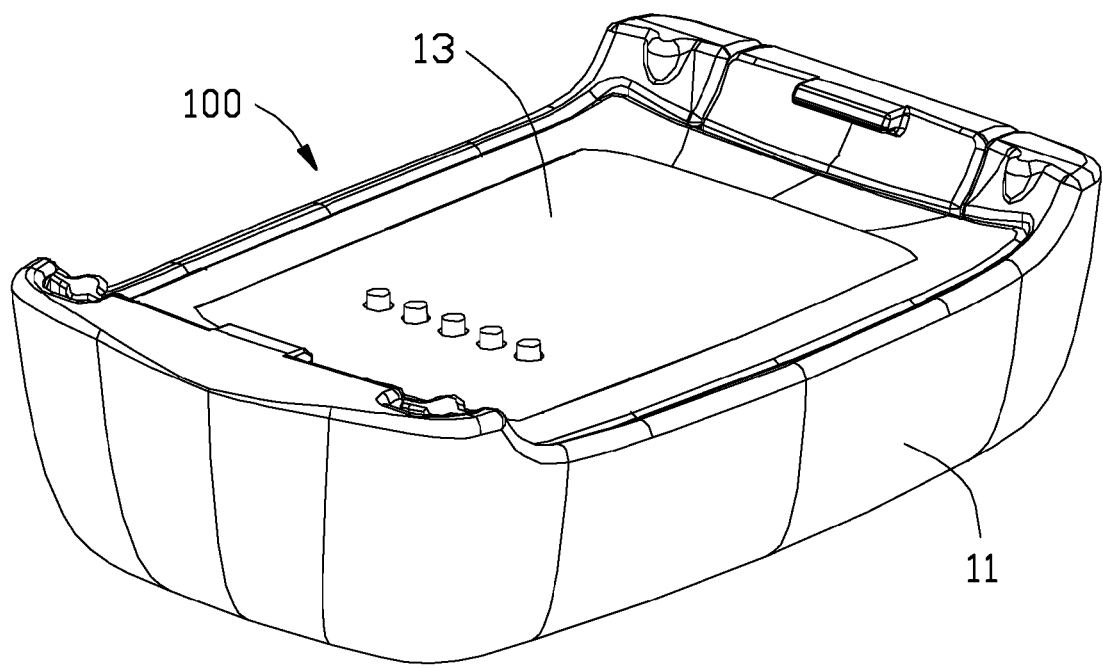
FIG. 2 is another perspective view of the power adapter.
Figure 3:
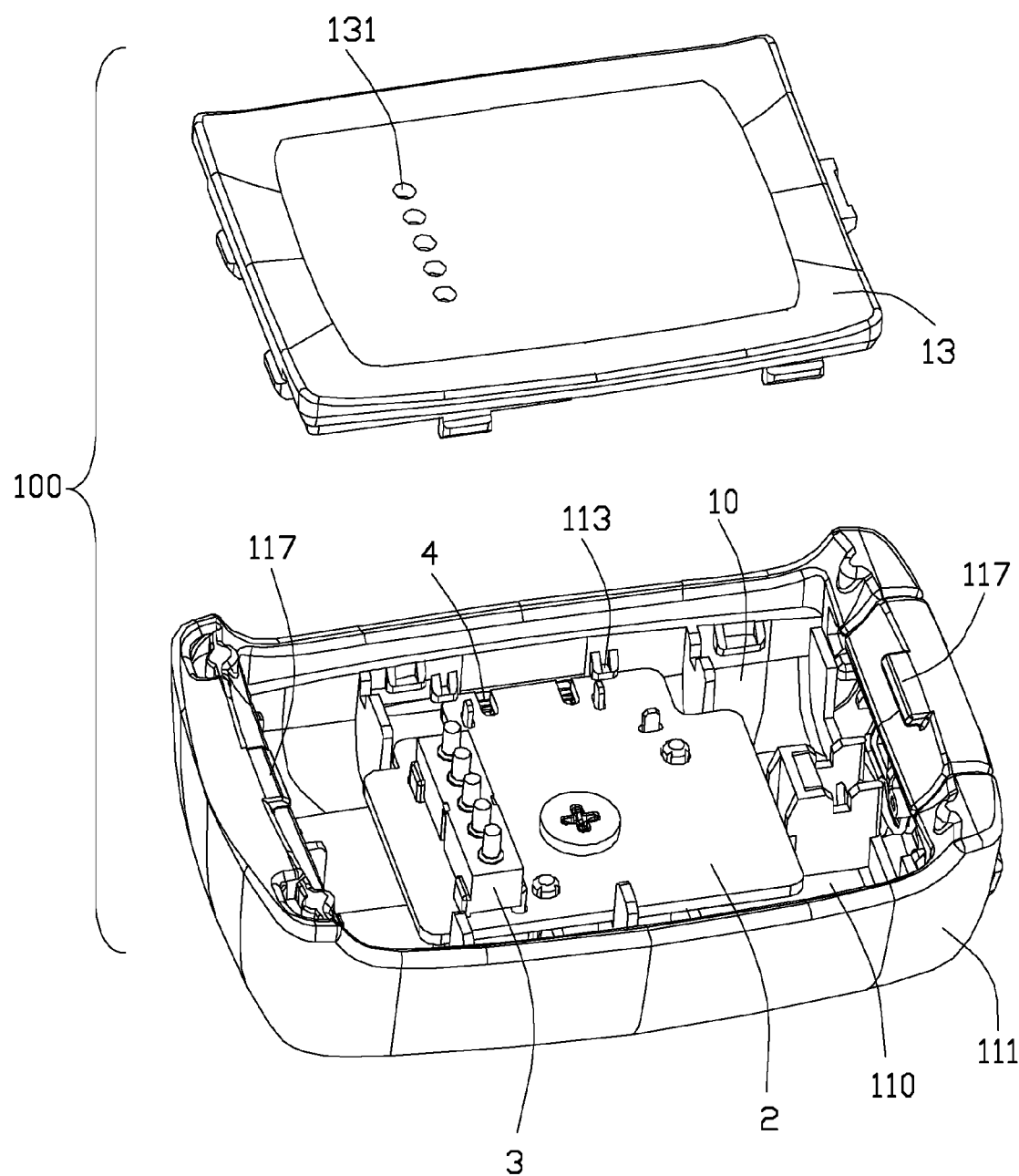
FIG. 3 is an exploded view of the power adapter.

Referring to FIGS. 1-3, a power adapter 100 is used for charging for a smart bracelet, the power adapter 100 is generally shaped as a box. The power adapter 100 includes a receiving space 10 and a power connector 3 received in the receiving space 10, the power connector 3 includes a plurality of terminals 30 extending out of the top of the power adapter. The power adapter 100 includes an interface 40 of a Micro USB socket 4, i.e., an I/O (Input/Output) connector. When the power adapter 100 is in use, the smart bracelet is placed above the power adapter 100 and electrically connected with the terminals 30, the Micro USB socket 4 is connected with an external power source by a Micro USB plug, and the smart bracelet is charged. The internal structure of the power adapter 100 is described as below.

Figure 4:
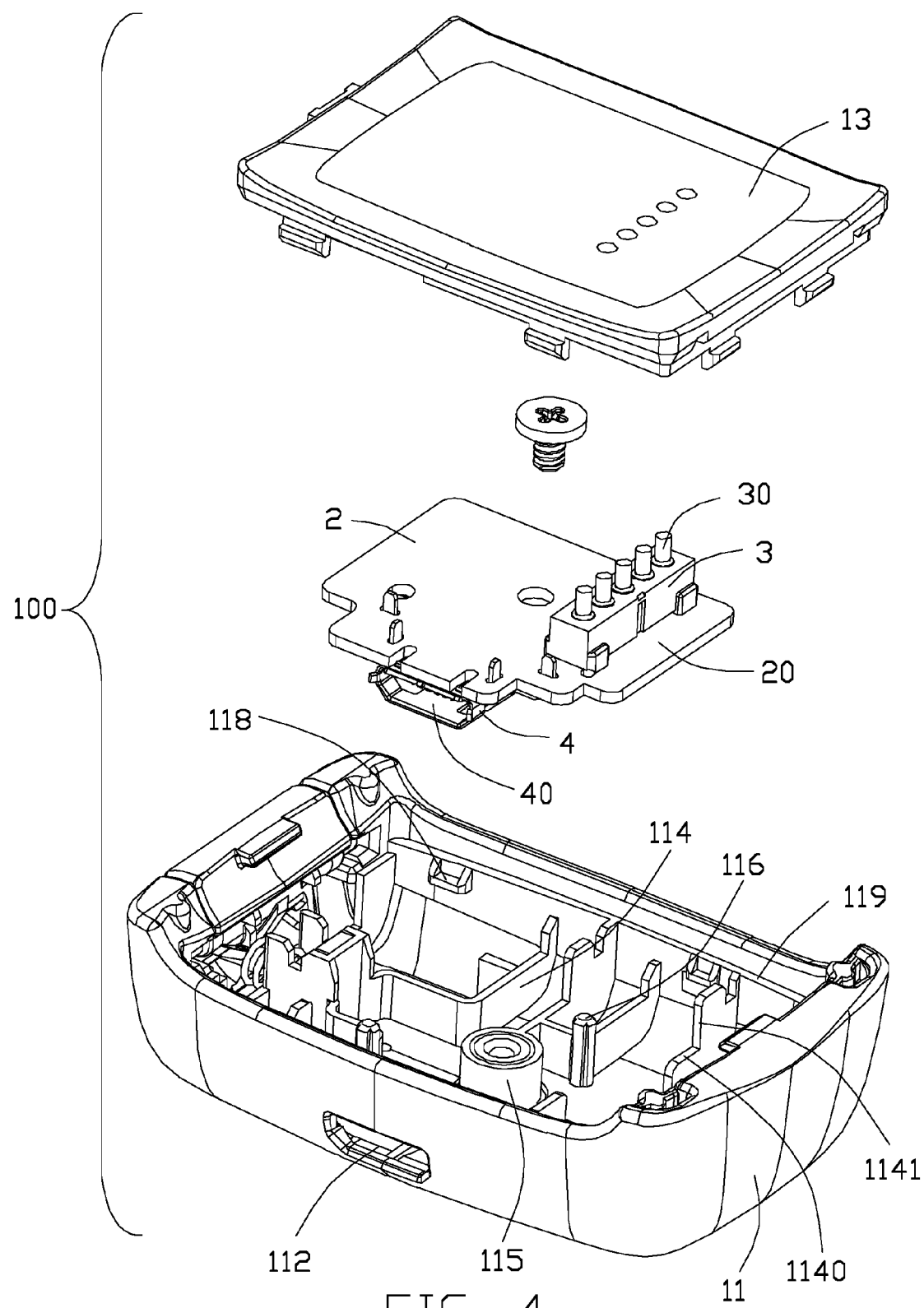
FIG. 4 is a further exploded view of the power adapter of FIG. 3.

Referring to FIGS. 3-4, the power adapter 100 includes a cover 1 and a printed circuit board module 2 within the cover 1. The cover 1 includes a base 11 and an upper cover 13 covering the base 11. The base 11 and the cover 13 are assembled together and define the receiving space 10. The base 11 includes a bottom wall 110 and a plurality of side walls 111 surrounding the bottom wall 110, the bottom wall 110 and the side walls 111 define the receiving space 10, the printed circuit board module 2 is received in the receiving space 10.

One of the side walls 111 defines an opening 112 corresponding to the Micro USB socket 4, the interface 40 of the Micro USB socket 4 exposes from the opening 112. The bottom wall 110 includes a plurality of ribs 114, a mounting post 115 placed in a central part of the bottom wall 110 and a plurality of positioning posts 116. The rib 114 includes a supporting face 1140 for supporting the printed circuit board module 2 and a protruding stopper 1141 for stopping the printed circuit board module 2 along a horizontal direction. The mounting post 115 is melted to receive a nut 60 therein. An upper face of the mounting post 115 is aligned with the supporting face 1140 of the rib 114. An upper face of the positioning post 116 is higher than the supporting face 1140 of the rib 114, so the printed circuit board module 2 can insert into the cover 1 easily. From a side view, the base 11 includes two latching members 117 protruding upwardly at two opposite ends, the latching members 117 protrude toward each other, the latching member 117 is used for latching with a corresponding structure of the smart bracelet placed above the power adapter 100.

Figure 5:
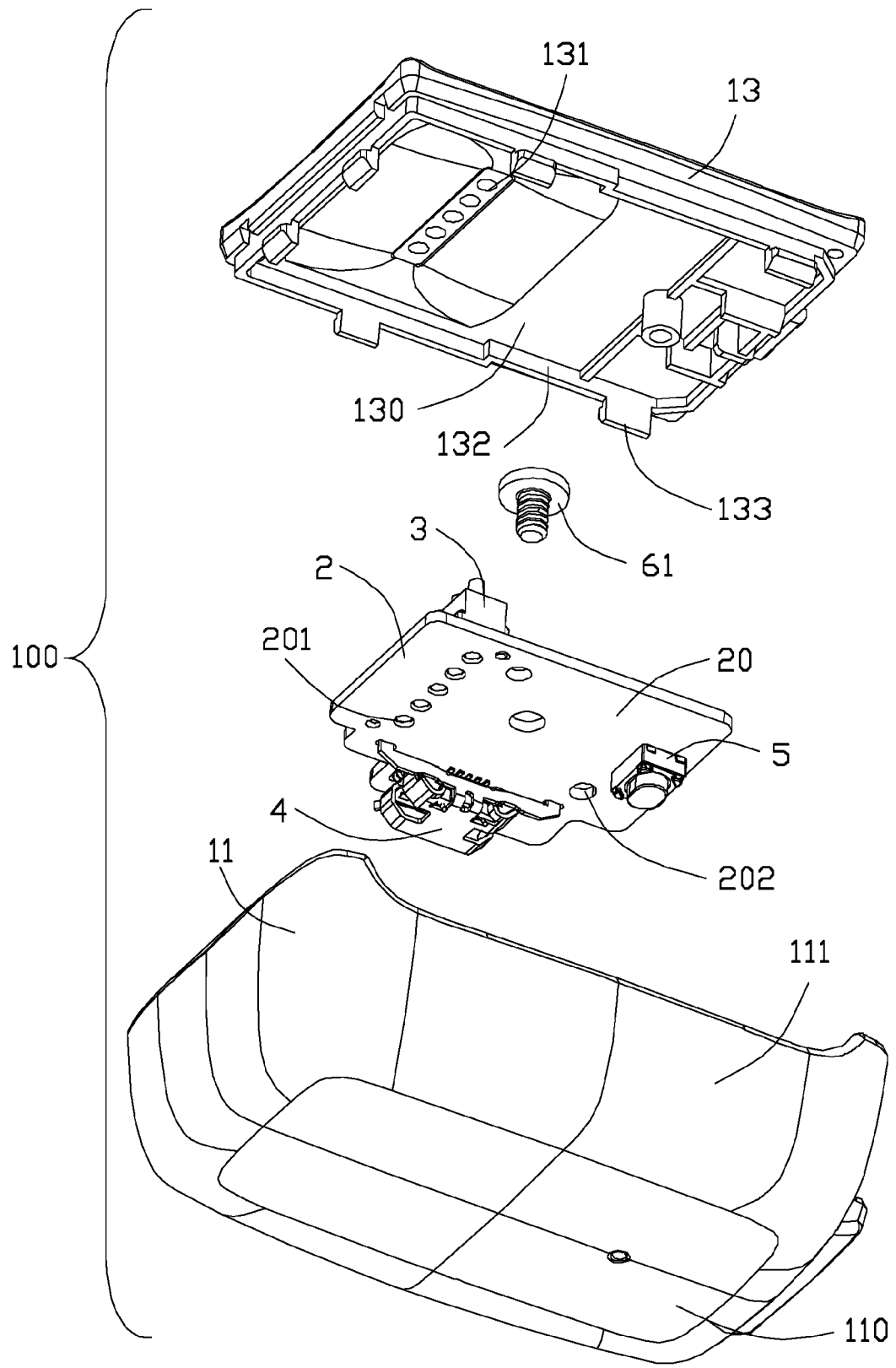
FIG. 5 is another perspective view of the power adapter of FIG. 4.
Figure 6:
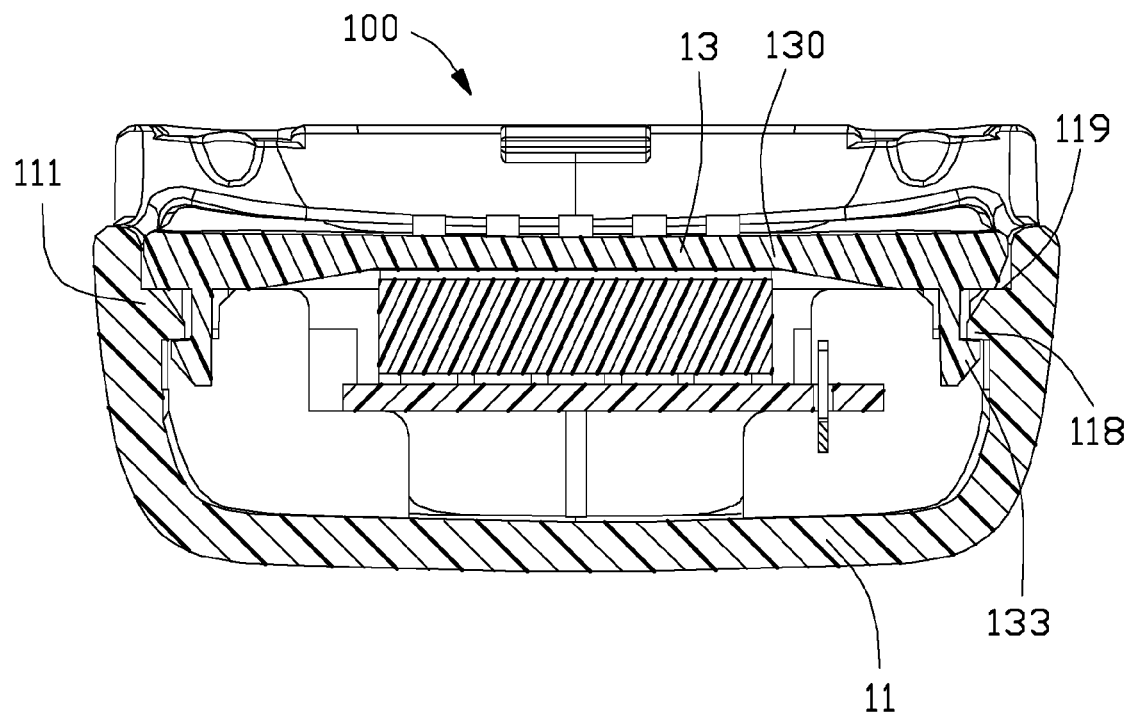
FIG. 6 is a cross-sectional view of the power adapter.

Referring to FIG. 5, the upper cover 13 is shaped as a slice, the upper cover 13 includes a top wall 130 with a plurality of through holes 131. The upper cover 13 includes a plurality of lateral edges 132 extending downward from four edges of the top wall 130 and a plurality of elastic hooks 133 extending from the lateral edges 132 continually. The side wall 111 of the base 11 includes a plurality of latching blocks 118. In this embodiment, the upper cover 13 has eight hooks 133 defined in four sides of the upper cover 13, the latching blocks 118 are defined corresponding to the hooks 133. The base 11 includes two step surfaces 119 each defined inside of the side wall 111, the step surface 119 is lower than the upper surface of the side wall 111. Referring to FIG. 6, when the upper cover 13 is mounted to the base 11, the upper cover 13 is trapped inside of the base 11, the top wall 130 of the upper cover 13 mates with the step surface 119, the hook 133 of the upper cover 13 mates with the latching block 118 for preventing the upper cover 13 from breaking away from the base 11. The upper surface of the top wall 130 is aligned with the upper surface of two long side walls 111 of the base 11.

Figure 12:
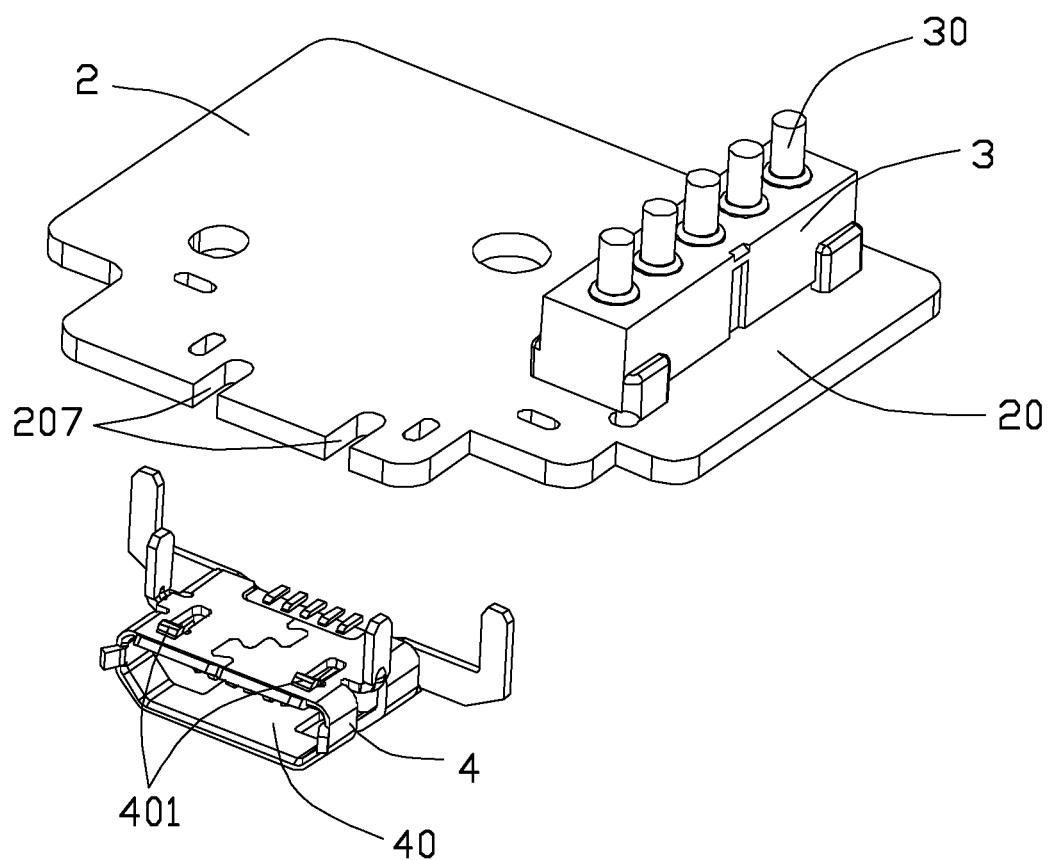
FIG. 12 is an exploded view of the printed circuit board module of the power adapter in accordance with the present invention

Referring to FIGS. 3-5, the printed circuit board module 2 includes a printed circuit board 20, the power connector 3, the Micro USB socket 4 and a switch 5. The power connector 3 is used for electrically connecting with the smart bracelet, the Micro USB socket 4 is used for electrically connecting with the external power source, the switch 5 is used for restarting the smart bracelet. The power connector 3 is mounted onto the upper surface of the printed circuit board 20, the Micro USB socket 4 and the switch 5 are mounted onto the lower surface of the printed circuit board 20. The power connector 3, the Micro USB socket 4 and the switch 5 are common connectors. Notably, as shown in FIG. 12, the printed circuit board 20 forms a pair of slots 207 in which a pair of outward tabs 401 of the metallic shell (not labeled) of the Micro USB socket 4 are received so as to allow the Micro USB socket 4 can intimately abut against an underside of the printed circuit board 20, thus not only minimizing the vertical dimension of the whole module but also enhancing the supporting/retention to the Micro USB socket 4. The power connector 3 is a Pogo connector and includes five pin-shaped terminals 30 in a transverse arrangement in this embodiment. The printed circuit board 20 includes a plurality of conductive holes 201 electrically connecting with corresponding terminals 30, the printed circuit board 20 also includes a plurality of holes 202 used for mating with the positioning post 116. The Micro USB socket 4 is soldering in the printed circuit board 20 and includes a shell, the side walls and the rear wall of the shell include a plurality of mounting feet for soldering in the printed circuit board 20. The printed circuit board 20 is generally shaped as a rectangle. The power connector 3, the Micro USB socket 4 and the switch 5 are defined in three different edges of the printed circuit board 20. The power connector 3 and the switch 5 are defined in two transverse edges, the Micro USB socket 4 is defined in a longitudinal edge. When the smart bracelet is charged, a ribbon of the smart bracelet is extending along the longitudinal direction. The Micro USB plug is inserted along a transverse direction, so the Micro USB plug will not contact with the ribbon of the smart bracelet. The power connector 3, the Micro USB socket 4 and the switch 5 are mounted onto both surfaces of the printed circuit board 20, so the printed circuit board 20 is fully utilized.

Figure 7:
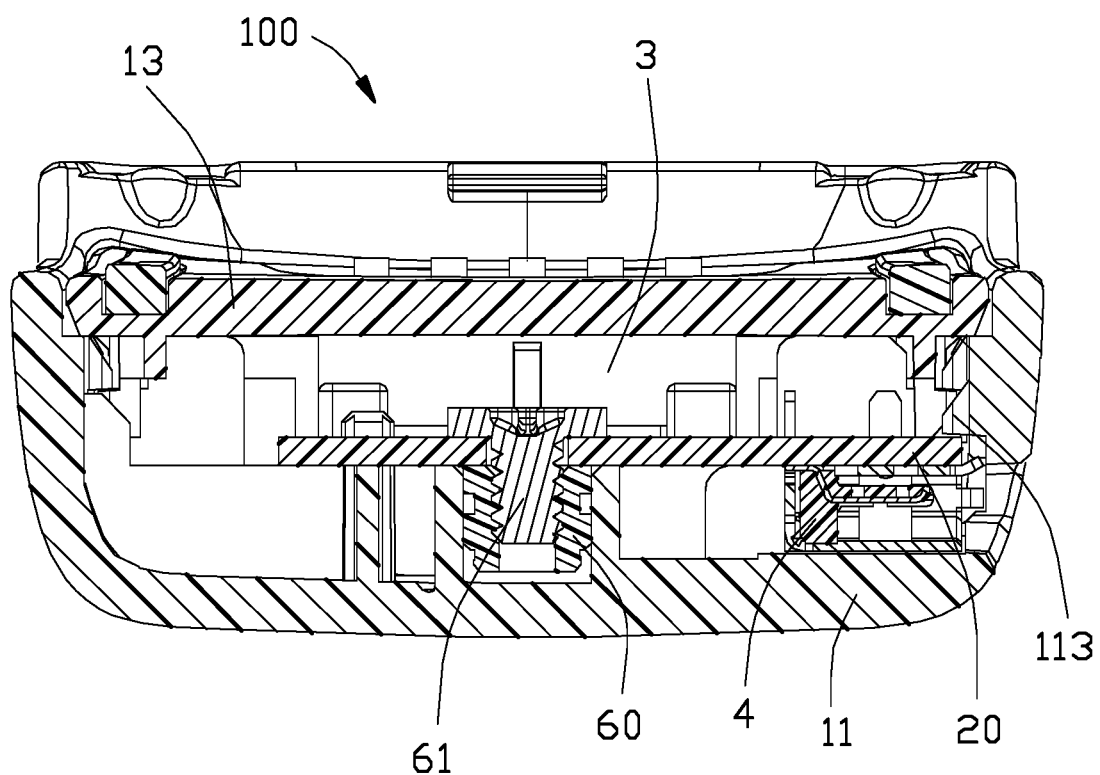
FIG. 7 is another cross-sectional view of the power adapter.

Referring to FIG. 3 and FIG. 7, the power adapter 100 includes a pair of stopping blocks 113 inside of the side wall 111 of the base 11, the pair of the stopping blocks 113 are defined close to the opening 112 and in two sides of the opening 112, the pair of the stopping blocks 113 are used for holding one edge of the printed circuit board 20. Referring to FIG. 5, when the printed circuit board module 2 is mounted into the receiving space 10 of the base 11, one edge of the printed circuit board module 2 is inserted into firstly and defined below the stopping blocks 113, then press the printed circuit board module 2, and the printed circuit board module 2 will be fixed to the base 11; the positioning posts 116 of the base 11 are inserted into the holes 202 of the printed circuit board 20; the printed circuit board module 2 is locked to the base 11 of the cover 1 by the screw 61 going through the printed circuit board 20 and mating with the nut 60 of the mounting posts 115. The stopping block 113 can limit and fix one edge of the printed circuit board module 2 defining the Micro USB. This avoid the printed circuit board module 2 shaking when the Micro USB plug is inserted into, especially when the Micro USB plug is inserted into along an inclined direction. The power adapter 100 is assembled after the upper cover 13 being fastened to the base 11. Referring to FIG. 1, the terminals 30 go through the holes 131 of the upper cover 13 and expose out of the upper cover 13. The interface 40 of the Micro USB socket 4 is aligned with the opening 112 of the base 11 and exposes from the opening 112.

The cover 1 of the power adapter 100 of this invention has an improve point, the base 11 of the power adapter 100 is a separated structure, a part of the base 11 is movable, the latching member 117 of the top of the base 11 can move outward and mate with the buckle of the smart bracelet.

Figure 8:
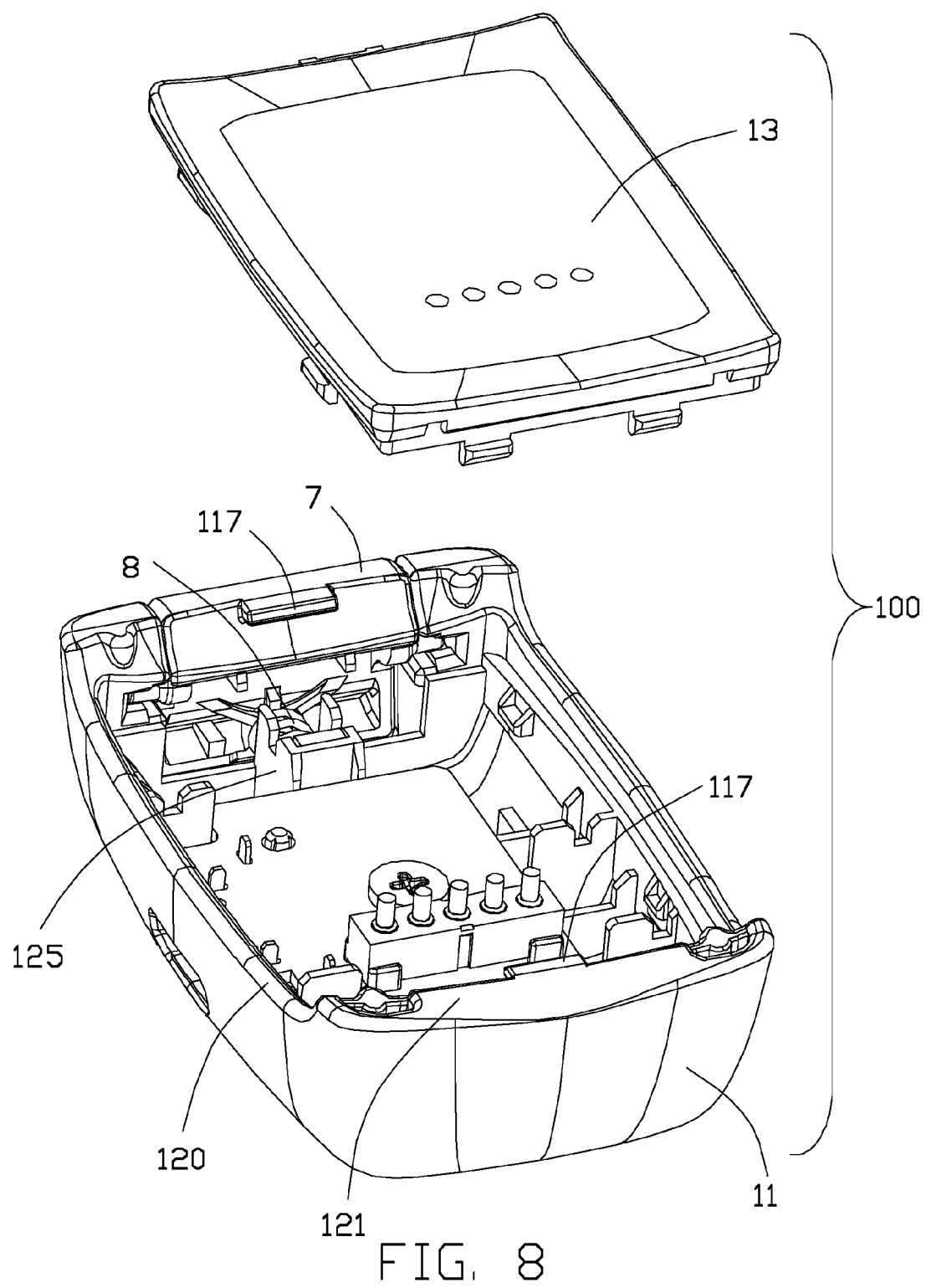
FIG. 8 is another perspective view of the power adapter with the upper cover separated from a base in accordance with the present invention.

Referring to FIG. 8, the side walls 111 of the base 11 includes two long walls 120 and two short walls 121, the short wall 121 is higher than the long wall 120, the latching member 117 is defined at the top of the short wall 121. One of the short walls 121 is a separated structure, the middle portion of the short wall 121 is a movable block 7 in another molding process, the movable block 7 is pivot to the base 11, the movable block 7 can rotate outward with the latching member 117 moving outward, when an external force releases, the movable block 7 resets with the help of a spring 8. In this embodiment, only one short wall 121 is formed by this way. In the other embodiments, each of two short walls 121 defines a movable block 7, so two latching members 117 both can move outward.

Figure 9:
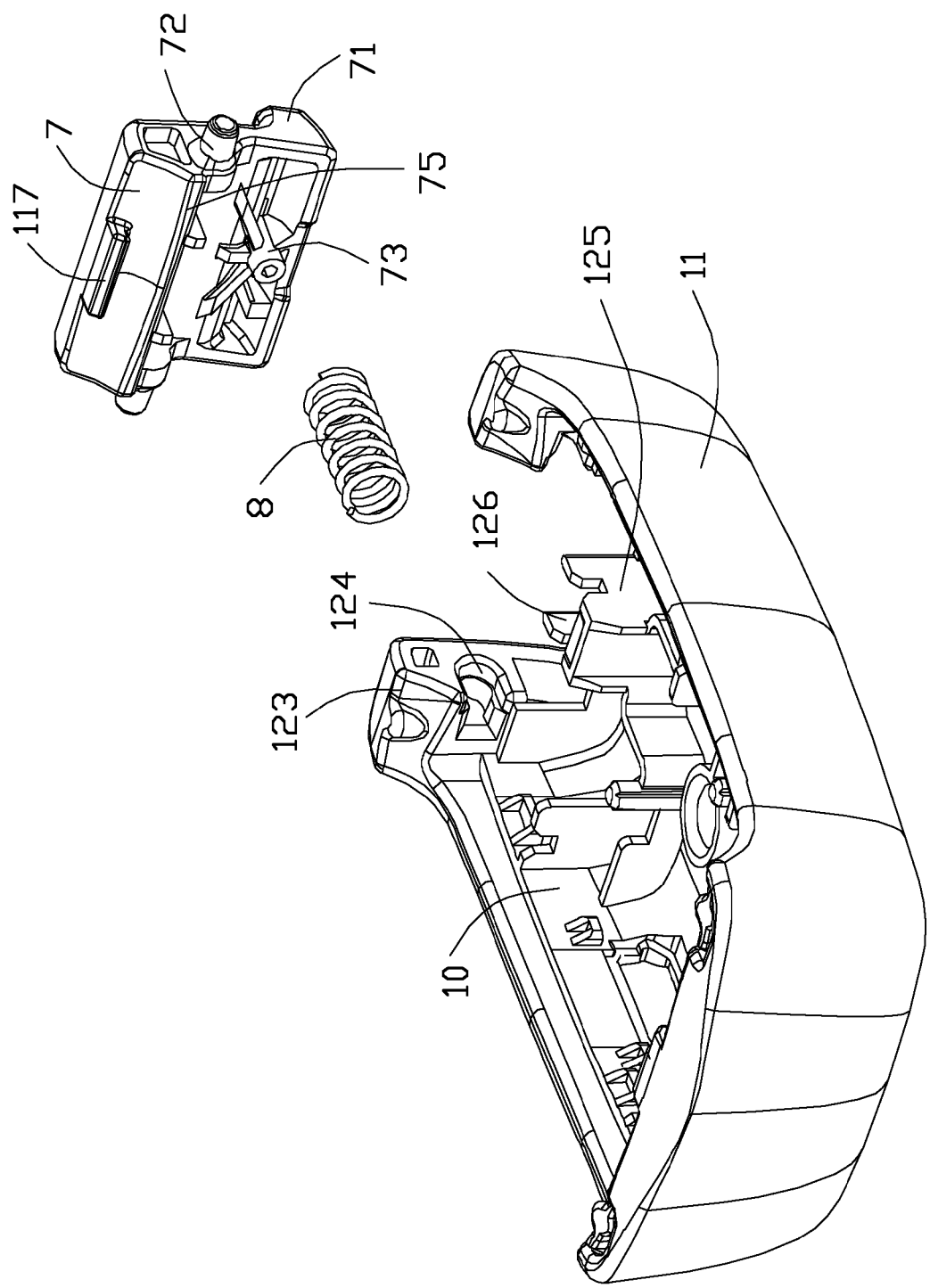
FIG. 9 is an exploded view of a base of the power adapter in accordance with the present invention.

Referring to FIG. 9, the short wall 121 with movable block 7 can be called a first side wall 121, the first side wall 121 includes the movable block 7 and two fixed walls 123 defined at two sides of the movable block 7. Each of the fixed walls 123 includes a pivotal hole 124 face to the movable block 7, the pivotal hole 124 extending through to the receiving space 10, a cross section of the pivotal hole 124 is approximately shaped as a semicircle outside and a rectangle inside, the height of the rectangle is smaller than the diameter of the semicircle, and this can avoiding the movable block 7 from sliding when the movable block 7 is rotating. The fixed wall 123 and the base 11 are integrated together. The bottom wall 110 includes a fixed seat 125 formed by three side walls protruding from the bottom wall 110 to the receiving space 10, the fixed seat 125 includes a fixed cavity 126 with a side wall opening, the spring 8 is received in the fixed cavity 126. The fixed seat 125 includes a part of the wall above the fixed cavity 126, this avoiding the spring 8 from sliding out.

The movable block 7 includes a body 70, an operating portion 71 protruding outward from the bottom of the body 70, a pivotal rod 72 protruding from the body 70, a positioning post 73 and a relying portion 75 protruding inward from the top of the body 70. The latching member 117 is located at the top of the body 70. The operating portion 71 is located at the bottom of a lateral side face of the body 70 and located outside of the base 11 after assembled to the base 11, the operating portion 71 is operated by hand for user. The pivotal rod 72 protrudes outward from two side surfaces of the body 70, the two side surfaces face to the fixed wall 123.

The pivotal rod 72 is generally located in the middle of the body 70 along a vertical direction. The positioning post 73 protrudes from the inner surface of body 70, the inner surface faces to the receiving space 10 and is used for being fixed by the spring 8. The location of the positioning pin 73 is close to the bottom of the movable block 7 and located below the pivotal rod 72. When assembling, the spring 8 is placed into the fixed cavity 126 firstly, two pivotal holes 124 of the movable block 7 are assembled into two pivotal holes 124 from one side of the receiving cavity 10, and one end of the spring 8 is set outside of the positioning post 73 of the movable block 7. The movable block 7 is assembled to the fixed wall 123 and the first side wall 121 is formed.

Figure 10:
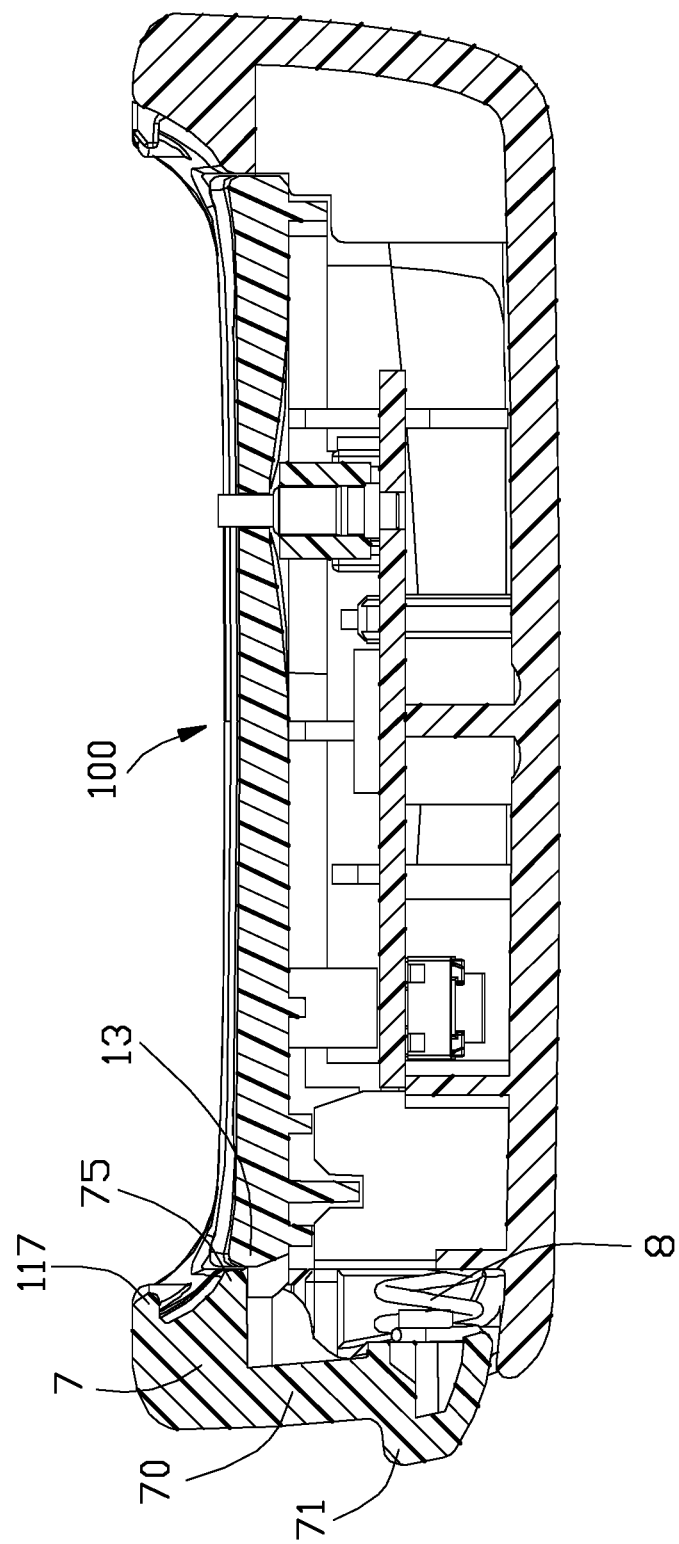
FIG. 10 and FIG. 11 are cross-sectional views of the power adapter showing a movable block of the base in different locations in accordance with the present invention.
Figure 11:
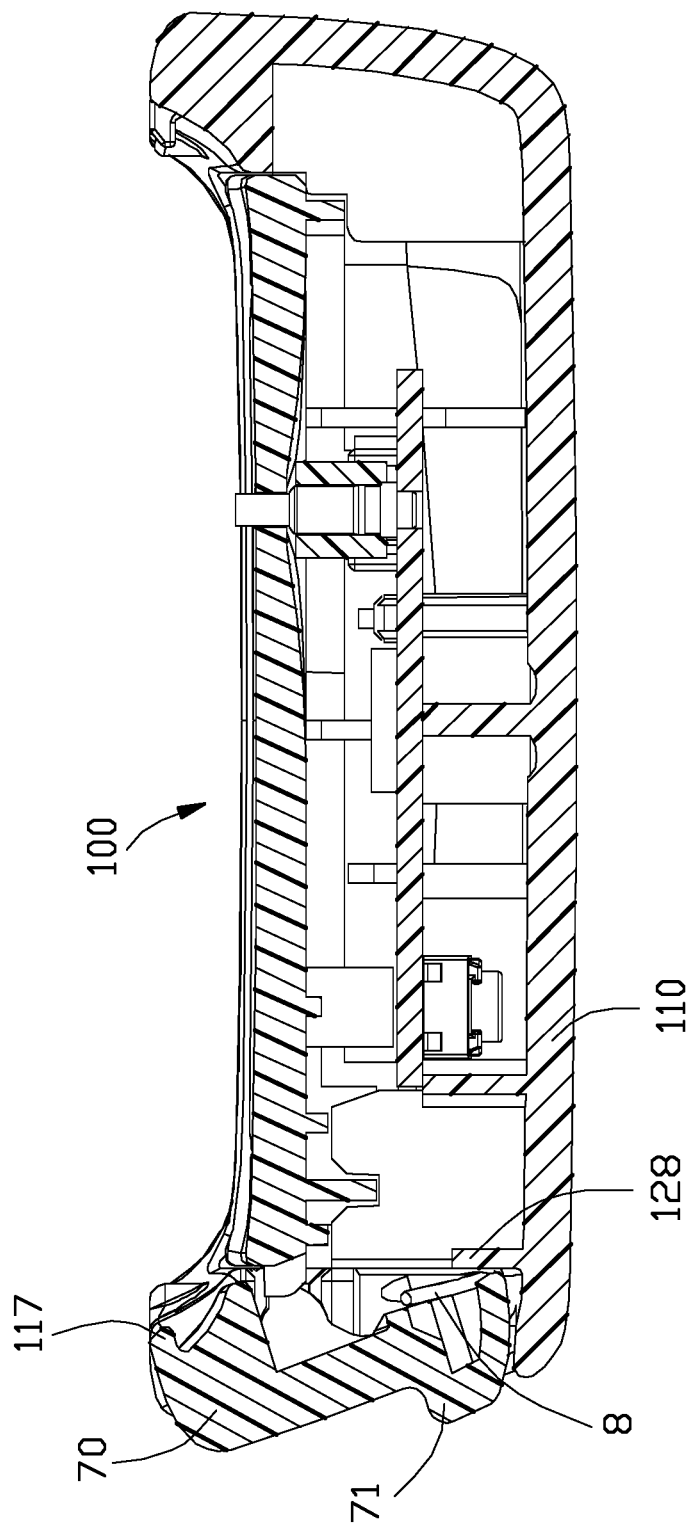

Referring to FIG. 10 and FIG. 11, when the power adapter 100 is not in use, the bottom portion of the movable block 7 is pushed outward by the pre compressive spring 8. The relying block 75 at the top of the movable block 7 relies on the edge of the upper cover 13, so the movable block 7 keeps still. When the power adapter 100 is in use, in order to avoid the smart bracelet contacting with the latching member 117 when the smart bracelet is placed above the upper cover 13, the latching member 117 should be moved away. The operating portion 71 is pushed inward by hands when operating, the movable block 7 rotates outward with the latching member 117 moving outward, at the same time, the spring 8 is further compressed. The movable block 7 is released after the smart bracelet is in place, the operating portion 71 is pushed outward with the resetting force of the spring 8, the movable block 7 is reset, the latching member 117 is reset, the latching member 117 mates with the notch of the side edge of the smart bracelet, this makes sure that the smart bracelet is not touched to fall off when the smart bracelet is charging. The bottom wall 110 also includes a retaining wall 128 for stopping the movable block 7 in order to avoid the movable block 7 rotating inward excessively.

In this embodiment, the movable block 7 is made of plastic, actually the movable block 7 can also use other material, such as metal. The power adapter 100 includes a first side wall 121 with a plurality of latching members 117, the first side wall 121 is a separated structure and forms a movable block 7. The latching member 117 can move outward. In this embodiment, two fixed walls 123 form an opening for fix the movable block 7, the movable block 7 forms a part of the first side wall 121, the movable block 7 drives the latching member 117 moving, not forming the receiving space 10, so the first side wall 121 also can be a single one, the movable block 7 is attached to the lateral side of the first side wall 121. The structure for being pivot to the movable block 7 can be a blocky structure, not a wall structure.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. A power adapter comprising:
a cover and a printed circuit board module received in the cover, the cover having a base and an upper cover covering the base, the base having a bottom wall and a plurality of side walls surrounding the bottom wall, the bottom wall and the side walls forming a receiving space for receiving the printed circuit board module, wherein
the cover has a plurality of latching members at the top of the side wall, the latching members are on both ends of the cover, the latching members are defined above the upper cover and extend to each other, the side walls comprise a first side wall with a rotatablely movable block, the latching member is defined at the top of the movable block so as to move outward with the movable block; wherein
the movable block is discrete from but pivotally mounted upon the first side wall, and constantly urged by a spring to a locking position.

2. The power adapter as claimed in claim 1, wherein the bottom wall has a fixed seat received in the receiving space, the movable block has a positioning pin, one end of the spring is set in the positioning pin, the other end of the spring is fixed to the fixed seat, the spring is defined between the fixed seat and the movable block, the spring is compressed inward with the movable block rotating outward under an external force, the movable block resets with a resetting force of the spring when the external force is releasing.

3. The power adapter as claimed in claim 2, wherein the spring is in a pre compressive state, the movable block is pushed outward continually, the movable block has a relying portion for relying on one edge of the upper cover, the relying portion is used for keeping the movable block still with no external force.

4. The power adapter as claimed in claim 1, wherein the bottom wall also has a retaining wall for avoiding the movable block rotating inward excessively.

5. The power adapter as claimed in claim 1, wherein the first side wall has two fixed walls integrated with the base, each of the fixed walls has a pivotal hole, the movable block has two pivotal rods at two sides, the pivotal rods are received in the pivotal holes respectively.

6. The power adapter as claimed in claim 5, wherein the pivotal hole extends through to the receiving space, the movable block is set between two fixed walls through the receiving space.

7. The power adapter as claimed in claim 5, wherein the movable block comprises a body and an operating portion protruding outward from the bottom of the body, the operating portion is set in a lateral surface of the body and for operating by a hand of a user.

8. The power adapter as claimed in claim 1, wherein the printed circuit board module comprises a printed circuit board, a Micro USB socket and a power connector, the Micro USB socket is mounted onto a lower surface of the printed circuit board and has an interface exposing outward, the power connector is mounted onto an upper surface of the printed circuit board and has a plurality of pin-shaped terminals, the pin-shaped terminals go through the upper cover and expose outside.

9. The power adapter as claimed in claim 8, wherein the printed circuit board has a switch module, the power connector, the Micro USB socket and the switch are defined in three different edges respectively.

10. The power adapter as claimed in claim 1, wherein the bottom wall has a plurality of ribs, the ribs form a supporting surface for supporting the printed circuit board module, the side wall has a pair of stopping blocks, the stopping blocks are relying on the edge of the printed circuit board module for avoiding the printed circuit board module shaking.

11. A power adapter comprising:
a cover defining a base and an upper cover covering the base, and the base having a bottom wall and a peripheral wall around the bottom wall, the peripheral wall and the bottom wall cooperatively define a receiving space; and a printed circuit board module retained within the receiving space;

wherein at least two latching members respectively disposed on two opposite ends of the assembled peripheral wall and the upper cover in a lengthwise direction, said two latching members are located above an upward face of the upper cover and extend toward each other, and the peripheral wall is equipped with a movable block, and one of the latching members is formed on a top of the movable block and can move outwardly with the movable block; wherein said movable block is discrete from but pivotally mounted upon the peripheral wall and constantly urged by a spring to a locking position.

12. The power adapter as claimed in claim 11, wherein the bottom wall provides a fixed cavity located in the receiving space, and said spring is set between the fixed cavity and the movable block by one end fitting for a positioning post projecting from a lower portion of the movable block and the other end retained to the fixed cavity, the spring is compressed inward while the movable block rotates outwardly under an external force.

13. The power adapter as claimed in claim 11, wherein said movable block is pivotal about the peripheral wall along a pivot axis extending along a horizontal transverse direction perpendicular to said lengthwise direction, and is equipped with a spring constantly urging a bottom portion of the movable block to move outwardly along said lengthwise direction so as to have the corresponding latching member located in an inward locking position when no outward external force is imposed upon said latching member.

14. The power adapter as claimed in claim 13, wherein said peripheral wall forms a pivotal hole inwardly communicating with the receiving space in the lengthwise direction so as to allow the movable block to be assembled thereinto along the lengthwise direction, and the upper cover abuts against an upper portion of the movable block to resist a force derived from the spring and to stop the latching member in a locking position.

15. The power adapter as claimed in claim 11, wherein the other of said two latching members is immovable.

16. The power adapter as claimed in claim 11, wherein the printed circuit board module includes a printed circuit board with an I/O (Input/Output) connector and a power connector located upon two opposite surfaces of the printed circuit board.

17. The power adapter as claimed in claim 16, wherein the I/O connector has a metallic shell with a pair of outward tabs to be received within a pair of slots formed in the printed circuit board.

18. A power adapter comprising:
a cover defining a base and an upper cover covering the base, and the base having a bottom wall and a peripheral wall around the bottom wall, the peripheral wall and the bottom wall cooperatively define a receiving space; the peripheral wall providing at least two latching members respectively disposed on two opposite top ends thereof, which are located above the upper cover and extend toward each other of which one is outwardly moveable; and a printed circuit board module retained within the receiving space and including a printed circuit board with a power connector and an I/O (Input/Output) connector respectively mounted upon two opposite surfaces of the printed circuit board; wherein upper ends of terminals of the power connector extend upwardly beyond the upper cover, and the I/O connector includes a metallic shell with a pair of outward tabs received within a pair of slots formed in the printed circuit board so as to have the metallic shell intimately abut against the printed circuit board.

19. The power adapter as claimed in claim 18, wherein the peripheral wall forms at least one stopping block on an interior surface thereof, against which an upper surface of the printed circuit board abut.

20. The power adapter as claimed in claim 19, further including a screw to lock the printed circuit board to the base.

* * * * *